(12) United States Patent
Fernandez-Martinez

(10) Patent No.: US 6,408,072 B1
(45) Date of Patent: Jun. 18, 2002

(54) BRACELET TELEPHONE DEVICE

(76) Inventor: José Ignacio Fernandez-Martinez, Churruca 8, Alicante (ES), 03003

( * ) Notice: Subject to any disclaimer, the term of this patent is extended or adjusted under 35 U.S.C. 154(b) by 0 days.

(21) Appl. No.: 09/011,310
(22) PCT Filed: May 28, 1997
(86) PCT No.: PCT/ES97/00133
§ 371 (c)(1), (2), (4) Date: Sep. 11, 1998
(87) PCT Pub. No.: WO97/48222
PCT Pub. Date: Dec. 18, 1997

(30) Foreign Application Priority Data

Jun. 7, 1996 (ES) .......................... 9601563 U

(51) Int. Cl.$^7$ ............................... H04M 1/00
(52) U.S. Cl. .................................. 379/433.1
(58) Field of Search ............... 379/433, 428, 379/446, 455, 454, 447, 433.1; 368/10, 282

(56) References Cited

U.S. PATENT DOCUMENTS

| | | | |
|---|---|---|---|
| 4,586,827 A | | 5/1986 | Hirsch |
| 4,847,818 A | * | 7/1989 | Olsen ................... 379/428 |
| 5,224,076 A | | 6/1993 | Thorp |
| 5,239,521 A | * | 8/1993 | Blonder ................ 368/10 |
| 5,467,324 A | * | 11/1995 | Houlihan ............. 379/428 |
| 5,557,671 A | * | 9/1996 | Endoh ................. 379/368 |

FOREIGN PATENT DOCUMENTS

| | | | |
|---|---|---|---|
| CH | 587471 | 4/1977 | |
| GB | 2194119 | 2/1988 | |
| WO | WO 9633569 | 10/1996 | |
| WO | WO 96/33569 | * 10/1996 | ................ 379/433 |

OTHER PUBLICATIONS

Patent Abstracts of Japan, vol. 017, No. 456 (–1418), Aug. 20, 1993 & JP 05102909 A (Matsushita Electric Ind. Co. Ltd) the abstract.
Patent Abstracts of Japan, vol. 018, No. 373 (P–1769), Jul. 13, 1994 & JP 06102374 A (Fujitsu Ltd) the abstract.
Patent Abstracts of Japan, vol. 095, No. 003, Apr. 28, 1995 & JP 06350506 A (Matsushita Electric Ind. Co. Ltd) the abstract.

* cited by examiner

Primary Examiner—Jack Chiang
(74) Attorney, Agent, or Firm—Kilpatrick Stockton LLP

(57) ABSTRACT

The bracelet telephone device comprises a wireless telephone terminal or mobile telephone mounted on an embracing element like a bracelet which incorporates electronic connection bus wherein the mobile telephone has two parts removably coupled to each other and which can be separated from each other, including a total separation, but remaining electrically connected by means of an extensible cable, and having also removable power supply batteries. Additionally, other blocks or elements, such as a watch, a calculator or the like, are also mounted removably on the bracelet on the side opposite to the mobile telephone are also connected by said plurality of bus. In a preferred embodiment, the keyboard of the mobile telephone incorporates engraved symbols of the Braille alphabet for sightless users.

5 Claims, 2 Drawing Sheets

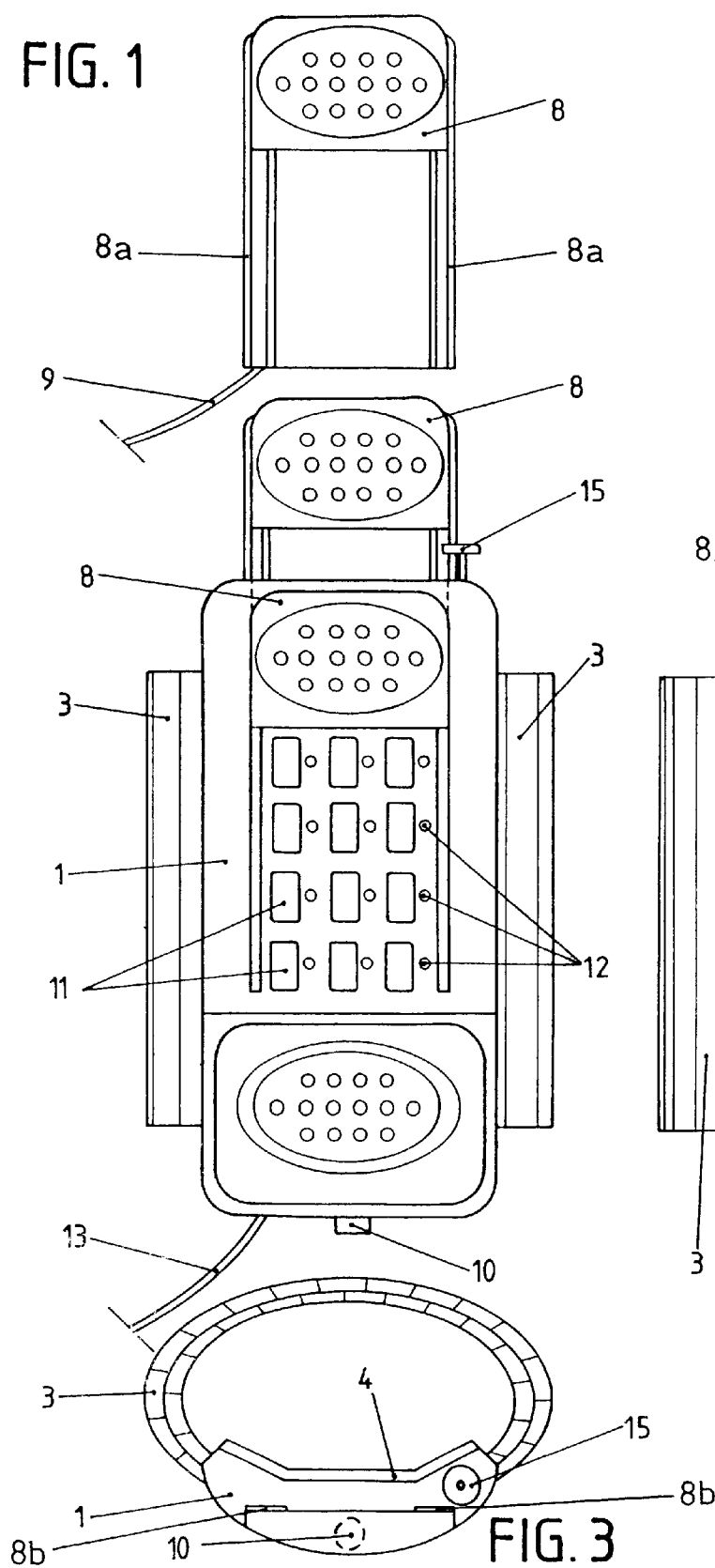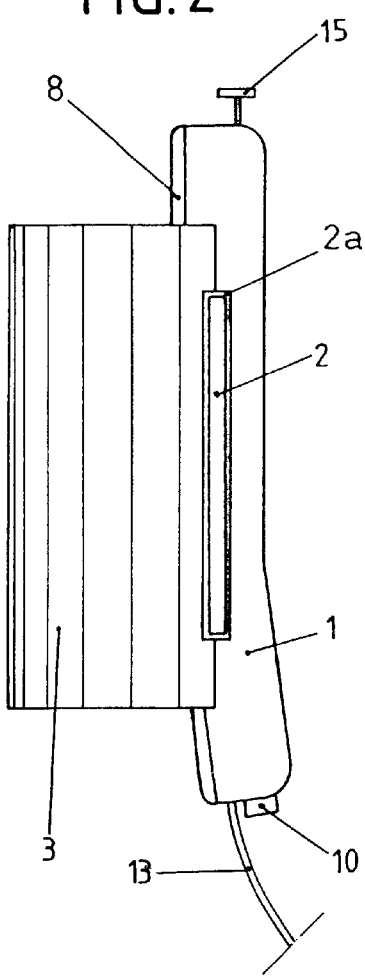

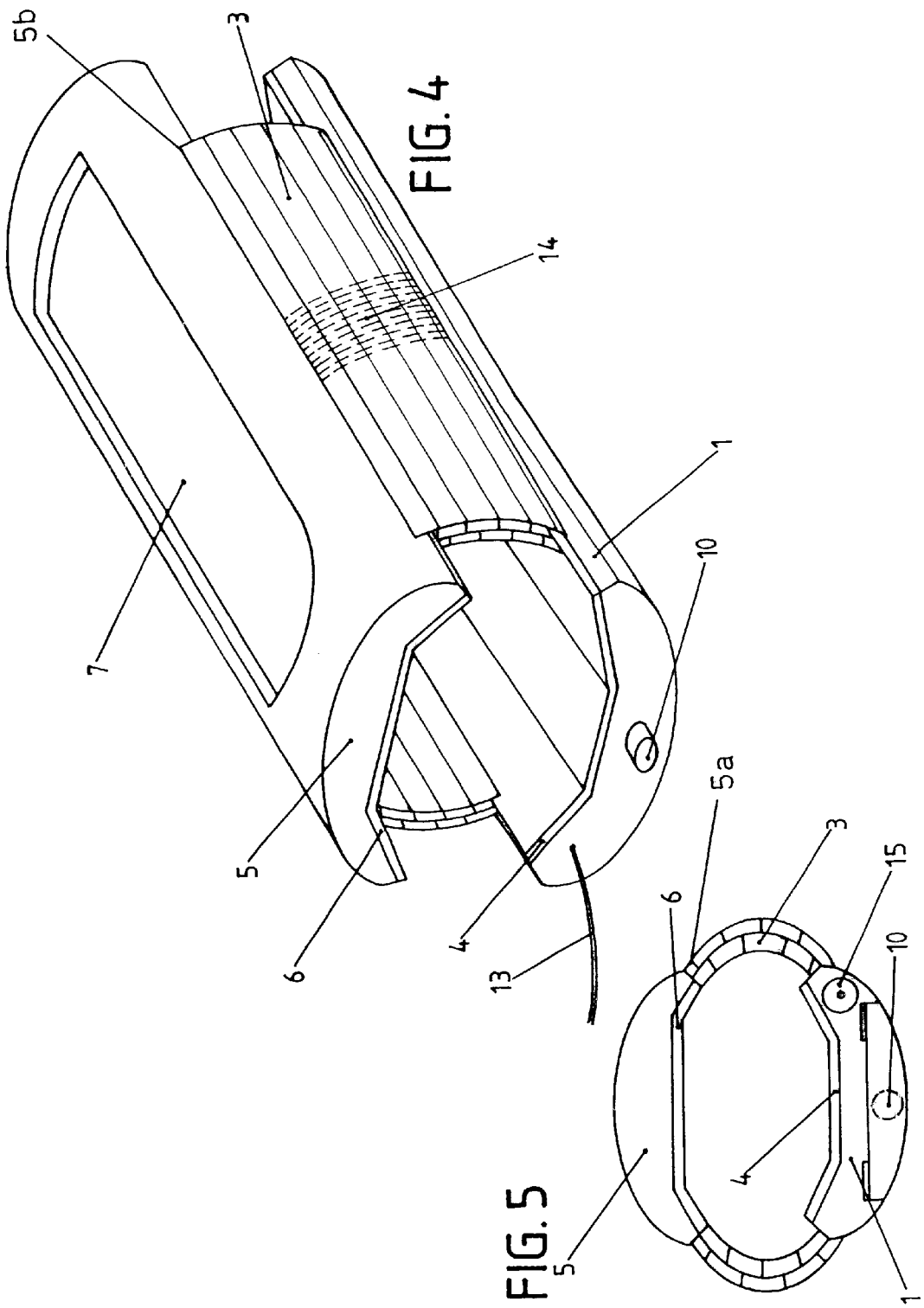

BRACELET TELEPHONE DEVICE

FIELD OF THE INVENTION

The present invention refers to a movable telephone or wireless telephone terminal, having the suitable disposition for the most comfortable positioning at the wrist of the wearer, easy to use and with a variety of possibilities by virtue of its extractable earphone, with the faculty of incorporating optional complementary elements, with capacity to be connected to peripherals and provided with an alarm device and an special keyboard for blind people in case such elements are requested.

BACKGROUND OF THE INVENTION

In the present day, the use of portable telephone devices which allows the user to be in permanent contact with his work place, his clients, his home, etc. is more and more prevalent. Such devices present the disadvantages which are logically derived from their transport, such as the inconvenience of carrying them in the hand, in a case which can be adapted to the belt, in a handbag or a purse used for that purpose, as well as their usual risk of loss at a client's place or other places and the inability of using one's hands for other activity at the same time.

On the other hand, in our times, and especially in the business world, there are more and more elements and electronic or other kind of devices that, unceasingly, are necessary to perform preferred functions. It is necessary to point out the continuous need to use timers, chronometers, calculating machines, electronic diaries, computers, alarms, etc., which make that the problems to transport such elements for a person who, because of the characteristics of his job, has to carry those devices out into different places and moving frequently, are more important every day, with the paradoxical case that, often, the inconvenience of the need for the mentioned continuous transport is more important than the work proper.

Equally, the above mentioned problem, derived from the need of using at the same time any of the mentioned elements and the telephone, which is very difficult, not to say impossible, before the necessity of holding the later in one hand, has a lot of relevance.

From the prior art is known a device which can be worn on the user's wrist and provided with a telephone element, computer, and timer, but such device has several disadvantages such as the difficult use of the telephone, the most important of which makes it necessary to pull down a cover to which the earphone is incorporated, something which is very difficult because of the way it is positioned on the forearm and the hard weight that it has to hold up.

Today, other elements resulting from the study of the precedent art, such as timers provided with minuscule telephone devices, are just a fancy or a curiosity, since, because of their size, it is impossible to obtain the services which are usually needed, with no mention of the great difficulty to dial.

In modern days, there are many situations in which the fact of having an alarm may be decisive in a so favorable way that it may even save a life, for example in the case of a person who is suddenly ill and is alone, in the case of a robbery, or any other incident which requires the help of somebody else. The use of alarms at premises or in vehicles is frequent, whether they are optical, sonic, ultrasonic or telephonic; but they are usually not used by humans, something which could be very useful in such cases as already mentioned, or others such as the case of a person who travels an unfrequented road or who performs dangerous jobs, a cashier of a bank, etc., jobs in which, for example, one alarm telephone with a call to his home, his work place, a police station or some other appropriate places, could be decisive many times, but, especially, would be a greater assurance for the user.

All of the facts directed to improve the lack of necessary conditions involving the persons suffering a handicap have a lot of human and social relevance. In the case of a blind person, who, because of her handicap, is probably the one who specially needs to communicate with more precision with other persons through sounds, she has the problem of difficulty to perform telephone calls and, if they have the chance, when they get used enough to a certain apparatus, they can dial a certain number, even though this means to them an obstacle leading to a greater effort and, furthermore, they need a long time to get used to the features of the apparatus, something which will occur each time they change it.

BRIEF SUMMARY OF THE INVENTION

The object of the invention is to develop a telephone device which can be adapted to the wrist and forearm of the wearer and which can be simply and comfortably used, which weighs as little as possible, and with an alarm system as well as a keyboard having Braille code for blind people and optionally joined to other elements, such as timers, chronometers, calculating machines, electronic diaries, computers or any others.

According to the present invention, the premises followed are reached by means of a movable telephone or a wireless telephone terminal, with a removable earphone and an electric cable for connecting an external electric battery or the self-contained battery of the device or telephone terminal, as well as an alarm and a keyboard complementary to the usual, engraved with the Braille code; the telephone element of which is provided with joint members to a wrist and forearm embracing element that on its opposite side, can also be joined or not to another element, bearing one or various devices, such as a timer, a chronometer, a calculating machines, an electronic diary, a computer, etc. In such a way, the removable earphone will allow a simple and comfortable use, as well as other advantages which, will be named later, the feeding separation, will obtain the sensible reduction of the weight upon the alarm, and the rest of the elements and devices, optionals, will fulfill the functions they had assigned, being selectively changed by the user.

Some other features and advantages of the invention will result clearer from the following description, performed with the help of the drawings enclosed, referring to an embodiment example non restrictive.

BRIEF DESCRIPTION OF THE DRAWINGS

FIG. 1 illustrates a top view of the telephone device, with the detail of three of the positions which can be adopted by the earphone which it has, joined to the embracing element.

FIG. 2 shows a side elevation view corresponding to the said elements.

FIG. 3 illustrates a front elevation view of the same elements.

FIG. 4 represents a perspective view of the same elements, on the optional case of being joined to the above mentioned embracing element in the opposite side of the telephonic device, a comprehensive body of one or various different elements.

FIG. 5 illustrates a front elevation view of the whole, represented on the perspective of FIG. 4.

DETAILED DESCRIPTION OF PREFERRED EMBODIMENT

The movable telephone and/or wireless telephone terminal 1, is provided with conventional joining means 2 which allows the joining of an embracing element 3, such as a chain, wristband, strap, belt, clip or any other appropriated for its suitable fixing to the user's forearm; at the same time that they delimit an opening 2a to allow the way inside the element 1 of optional electronic connection buses 14, inserted into the embracing element 3. As shown more clearly by FIG. 3, said telephone device 1 will have a configuration adapted to the anatomy of a user' arm with U-shaped cross section with divergent branches and will be provided, on the face which is in contact with the skin, with a layer 4 made of an appropriate material so as to allow a flexible support, a soft and comfortable contact, with suitable properties from the dermatologic and antiallergic point of view, such as rubber or latex, scientifically treated to obtain such properties, as the case may be.

The interior face of the embracing element 3, intended for remaining in contact with the user's skin, will have properties similar to the ones described for layer 4. The movable telephone and/or wireless telephone terminal 1 has an earphone 8 which can displace through guides 8a–8b to displace with regard to the box of movable telephone and/or wireless terminal 1 or even until the earphone is separated therefrom. Such a property, besides solving the inconvenience of using previous apparatus which require the user to pull down the cover to which the earphone is incorporated, has the advantage of being able to adjust the distance between the microphone and the earphone, so as to be adapted to the distances between the mouth and the ear of different users and, in the case of complete separation, its possible connection with any exterior peripheric element, such as a nearby recorder or a amplifier when desired, the possibility to prevent listening by a third person, as well as the option of connecting to computers, printers, or other elements. That is shown in FIGS. 1–3, in which it can seen that earphone 8 has guides 8a which extend through grooves 8b provided in section 1, whereby said earphone 8 can displace in the longitudinal sense and even detach therefrom, as shown in a especially clear way in FIG. 1.

The connection maintenance between the earphone 8 which can be separated and the rest of the telephonic block 1, is possible by using a wire 9, very extensible and rolled up in the inside of the base block or the supplementary exterior one, or even by means of proper wireless connection providing elements of enough sensitivity and power. The earphone which can be separated may serve, at the same time, as a complement to work as a personal audio player, a flap element, a miniature, a pocket, etc.

In order to lighten the weight that the user's forearm has to hold, the telephone device 1 has a extensible and rolled-up wiring 13, the opposite end of which is connected to an external electric battery (not shown) or to the self-contained battery of the device or telephone terminal itself that, in this way, may be accommodated inside a pocket, independently from the rest of the apparatus, which remains joined to the forearm. The extensible and rolled-up wiring can be of any kind known by those skilled in the art.

In the same way, optionally, it may be provided with an alarm, which can be complemented or not with a personal code, actuated through a button 10 or two of them so as to avoid any accidental or undesired activation; it may be an optical alarm, to call up the attention, a sonic alarm for the said task or to provoke the escape of a possible aggressor; an ultrasonic to a receiver, at a pre-established place, or a telephonic link to cause connection with a preset number stored in the memory for that purpose. The relevance of this device is evident for the cases of emergency, robbery, misleading of children or elderly, and security for certain ill people with a cardiovascular, asthmatic, epileptic disease, a handicap, etc., or simply for a person who travels alone, in the case of a accident. This button 10 can be located in any suitable way as is known by those skilled in the art.

In the same way, as an optional equipment complementary to the totality of the keyboard or to the main keys, the existence of a keyboard 12 engraved with the Braille code symbols, so as to make easier its use for blind people, is a very important innovation.

As shown by FIGS. 4 and 5, the embracing element 3, consisting of a chain, strap, wristband, clip or any other, may be joined by its zone opposite to telephone device 1, to a body 5, provided with a recess-shaped area 7 in which there may be one of various elements, such as timers, chronometers, alarms, calculating machines, electronic diaries, computers or others (not shown), which can be located in any suitable way as is known by those skilled in the art. For this purpose, the body 5, which will be provided with a layer 6 with the same properties as the layer 4 from the element 1 for a pleasant and harmless contact with the user's skin and likewise, will be provided with a suitable anatomical form, that is to say, with U-shaped cross section with divergent branches, will also have a joining or coupling means 5b to said embracing element, as well as an opening 5b suitable for the passage of the electronic connection buses 14, inserted inside of it, in a similar way as above described for the coupling of telephone device 1.

The electronic connections may take place through the referred elements or from independent electronic connection elements. The whole may be provided with connection points adapted for external peripheric elements, such as battery fillers, supplementary batteries, etc.

It could be possible to provide some, various or the whole of the devices and accommodated elements with independent batteries of less capacity, for maintaining its independent operation, or as a deposit for energy or even for managing without the principal energy source during provisional periods.

The microphone corresponding to the telephone device 1, may be provided, optionally, with a pull down cover so as to improve the quality of the transmitted sound, to incorporate the said microphone to the pull down cover or to eliminate it, using an adequate polarizing microphone.

With all, besides the related advantages, it is possible to provide with various blocks or bodies 5, provided as interchangeable element in any way known by those skilled in the art, provided just with one or with various elements and to interchange them, depending on the needs of each moment.

Naturally, the telephone device 1, will be provided with an extensible pertinent antenna 15.

The embracing element 3 will be prepared in a convenient way so as to be able to be joined or separated on the area opposite to the telephonic element 1, through its longer symmetric axis, as well as the electronic connection buses 14 which are inserted in it, in order to, at the users wish, make it possible to carry only the telephone device 1 (case shown in FIG. 3), or to be joined also to an element or block 5, as shown in FIGS. 4 and 5, as well as to replace, according to its needs, a block or element with another one. For this purpose, on the same way, the means of a catch or an electronic connection of the elements and bodies 5, which will have to receive the longitudinal edges free from the element 3 and its buses 14, will be properly prepared for it.

It must be noted that, for reasons of descriptive economy, the detailed explanation of those elements that, because they are conventionals, they allow the possibility of choosing among them, has been avoided, and so they might be provided or selected in the forms that can be considered technically and industrially more appropriate.

The object of the invention has been described sufficiently, so it is only necessary to point out that the resulting embodiments about form, sizes, similar materials changes, as well as the derived from a routine application from what was developed before, must been included in its scope, in such a way that the invention will only be limited within the following claims.

What is claimed is:

1. A bracelet telephone device, comprising:

a wireless telephone terminal (1) with a body and joining means (2) for coupling the telephone device to an embracing element (3) adapted for mounting on a user's forearm and with connection buses (14) inserted into said embracing elements (3) for operative interconnection to the wireless telephone terminal with others various elements, where the wireless telephone terminal (1) comprises an earphone (8) mounted to the body through guides (8a–8b) to allow displacement of the earphone with regard to the body of said telephone device, characterized in that the earphone (8) is completely separated from said wireless telephone terminal (1) and maintains communication with the telephone terminal by means of a wireless connection with the telephone terminal.

2. Bracelet telephone device, according to claim 1, characterized by a button (10) operatively associated with the device for activation of an optical, sonic, ultrasonic or telephonic alarm of the telephone device.

3. Bracelet telephone device, according to claim 1, characterized by a second keyboard (12) provided with Braille code symbols for use by blind people, in addition to a main keyboard equipped with visual symbols.

4. Bracelet telephone device, according to claim 1, characterized by an electric connection (13) in the form of a cable for connecting an external battery or a self-contained battery of the telephone device.

5. The bracelet telephone device according to claim 1, further comprising:

a block (5) releasably located on said embracing element (3), in a position opposite to the telephone terminal (1), said block (5) including a recessed area (7) to house at least one additional electronic element, and the recess-shaped area (7) is provided on an upper face of said block (5).

* * * * *